US009309425B2

(12) United States Patent
Popat et al.

(10) Patent No.: US 9,309,425 B2
(45) Date of Patent: Apr. 12, 2016

(54) INK AND PRINTING PROCESS

(75) Inventors: Ajay Haridas Popat, Manchester (GB); Janette Cordwell, Manchester (GB); Marie Holmes, Manchester (GB); Philip John Double, Manchester (GB)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 246 days.

(21) Appl. No.: 14/116,147

(22) PCT Filed: May 8, 2012

(86) PCT No.: PCT/GB2012/051000

§ 371 (c)(1), (2), (4) Date: Dec. 16, 2013

(87) PCT Pub. No.: WO2012/153119

PCT Pub. Date: Nov. 15, 2012

(65) Prior Publication Data

US 2015/0035894 A1 Feb. 5, 2015

Related U.S. Application Data

(60) Provisional application No. 61/555,847, filed on Nov. 4, 2011, provisional application No. 61/514,819, filed on Aug. 3, 2011.

(30) Foreign Application Priority Data

May 11, 2011 (GB) .................................. 1107803.7
Nov. 3, 2011 (GB) .................................. 1118955.2

(51) Int. Cl.

*C09D 11/033* (2014.01)
*C09D 11/107* (2014.01)
*C08K 5/053* (2006.01)
*C09D 11/322* (2014.01)
*C09D 11/326* (2014.01)
*C08K 5/23* (2006.01)
*C08K 5/3417* (2006.01)
*C08K 5/3437* (2006.01)

(52) U.S. Cl.

CPC ............. *C09D 11/322* (2013.01); *C08K 5/053* (2013.01); *C08K 5/23* (2013.01); *C08K 5/3417* (2013.01); *C08K 5/3437* (2013.01); *C09D 11/326* (2013.01)

(58) Field of Classification Search

None

See application file for complete search history.

(56) References Cited

U.S. PATENT DOCUMENTS 5,596,027 A 1/1997 Mead et al.
5,716,435 A 2/1998 Aida et al.
6,262,152 B1 7/2001 Fryd et al.
6,454,846 B2 9/2002 Yatake
6,538,047 B1 3/2003 Miyabayashi
6,670,409 B2 12/2003 Yatake
6,846,352 B2 1/2005 Yatake
6,921,433 B2 7/2005 Kuribayashi et al.
7,008,994 B1 3/2006 Waki
7,307,109 B2 12/2007 Yatake et al.
7,524,892 B2 4/2009 Kataoka et al.
7,858,676 B2 12/2010 Waki et al.
8,084,516 B2 12/2011 Takemura et al.
2004/0009294 A1 1/2004 Kuribayashi et al.
2004/0176498 A1 9/2004 Ando et al.
2004/0242726 A1 12/2004 Waki et al.
2005/0182154 A1 8/2005 Berge et al.
2006/0178447 A1 8/2006 Burns et al.
2008/0002004 A1 1/2008 O'Donnell et al.
2008/0071007 A1 3/2008 Spinelli
2008/0118657 A1 5/2008 Taverizatshy et al.
2009/0202724 A1 8/2009 Arai et al.
2009/0220693 A1 9/2009 Takemura et al.
2011/0014439 A1 1/2011 Joshi et al.
2011/0040026 A1 2/2011 Lozman et al.
2011/0057982 A1 3/2011 Saito
2011/0057986 A1* 3/2011 Ikoshi ................. C09B 67/0013 347/21
2011/0069108 A1 3/2011 Fukuda
2011/0169900 A1 7/2011 Annable et al.
2011/0175972 A1 7/2011 Annable et al.
2012/0065293 A1 3/2012 Bisson et al.
2012/0306962 A1 12/2012 Holmes

FOREIGN PATENT DOCUMENTS

JP 2009-104834 A 5/2009
JP 2010-037363 A 2/2010
WO 2005080513 A1 9/2005

OTHER PUBLICATIONS ip.com disclosure IPCOM000147564D, "Inkjet Printing Inks Containing Encapsulated Pigments," Mar. 20, 2007.

* cited by examiner

*Primary Examiner* — Vu A Nguyen
(74) *Attorney, Agent, or Firm* — Banner & Witcoff, Ltd.

(57) ABSTRACT

An ink comprising an encapsulated particulate solid and a liquid vehicle wherein: I) the encapsulated particulate solid comprises a particulate solid encapsulated with a cross-linked dispersant shell; and II) the ink comprises the components: a. from 0.1 to 20 parts of the encapsulated particulate solid; b. from 20 to 40 parts of glycerol; c. from 1 to 30 parts of ethylene glycol; d. from 0 to 20 parts of 2-pyrrolidone; e. from 0.01 to 3 parts of surfactant; f. from 0 to 10 parts of water-soluble polymer; g. from 0 to 20 parts of polymer particles; h. from 0 to 2 parts of biocide; i. from 20 to 75 parts of water; wherein all the parts are by weight and the sum of the components a. to i. is 100 parts.

20 Claims, No Drawings

INK AND PRINTING PROCESS

RELATED APPLICATION DATA

This application is a National Stage Application under 35 U.S.C. 371 of co-pending PCT application PCT/GB2012/051000 designating the United States and filed May 8, 2012; which claims the benefit of GB application number 1107803.7 and filed May 11, 2011, which claims the benefit of U.S. application No. 61/514,819, and filed Aug. 3, 2011, which claims the benefit of GB application number 1118955.2 and filed Nov. 3, 2011, which claims the benefit of U.S. application No. 61/555,847 and filed Nov. 4, 2011, each of which are hereby incorporated by reference in their entireties.

FIELD OF INVENTION

The present invention relates to inks, especially ink jet printing inks and to vessels containing said inks. It also relates to printing processes using said inks (especially single pass ink jet printing processes).

BACKGROUND OF THE INVENTION

Home, office and many wide-format ink jet printers use scanning printer head technology (scanning ink jet printers). Scanning ink jet printers tend to have relatively limited print speeds. As a result scanning ink jet printers are less well suited to high throughput commercial applications. In scanning ink jet printers the printer head moves (scans) across the substrate, whilst the substrate is stationary. As the printer head scans across the substrate surface (often across the width of the substrate) droplets of ink are ejected towards the substrate thereby forming an image. Often, to obtain the best possible resolution or highest print density the scanning head will scan over the same substrate region several times to overlay ink droplets. The result of the scanning action is the formation of a relatively thin printed strip on the substrate. Only after the scanning head has formed the desired printed strip is the substrate moved (typically along the length of the substrate) by the printer mechanism such that another strip can be printed. In this manner a scanning ink jet printer slowly prints the required image.

Very recently single pass ink jet printers have been developed. Single pass ink jet printers offer much higher print speeds and were designed with the requirements of high throughput commercial applications in mind. In single pass ink jet printing one or more inkjet printer heads are in a fixed position and the substrate is printed typically in a single pass as it travels under the printer head(s). In single pass ink jet printers the printer heads are much larger typically as wide as the substrate itself.

Single pass ink jet printing imposes even more stringent requirements on the ink jet printing ink and the colorant when compared to scanning ink jet printing. In scanning ink jet printers the ink jet printer heads can be cleaned many times during the printing of a single sheet of the substrate. In contrast, in single pass printers the heads cannot be cleaned nearly so frequently. In addition, the higher print speeds and large volumes of ink ejected per minute means the ink has to work extremely robustly with the single pass printer mechanism. Accordingly, ink jet printing inks and colorants for single pass ink jet printers should desirably provide even higher levels of reliable operation in the printer.

More specifically, the ink jet printer inks and colorants for single pass ink jet printers should desirably provide:

i) long open times (good latency) such that the ink components do not dry out on the printer nozzle even when the nozzle is inactive for extended periods of time;
ii) high stability such that none of the components of the ink tend to flocculate, aggregate, precipitate or otherwise produce oversized particulate matter;
iii) high optical density (even in a single pass);
iv) excellent droplet formation and droplet breakup characteristics even at very short timescales or high droplet ejection frequencies;
v) high reliability when the ink is ejected through nozzles over extended periods;
vi) relatively fast drying of the ink once printed onto the substrate;
vii) good toxicology and using the lowest possible amounts of volatile organic liquids;
viii) low foaming characteristics;
ix) good light fastness and image permanence;
x) excellent ink storage stability;
xi) sharp prints on highly porous media such as corrugate.

Single pass ink jet printers often utilise very different substrates from home or office printers. A home printer might well use expensive substrates such as high quality photo papers. Photo papers typically have a high whiteness, high gloss and a highly controlled microporous structure adapted specifically for controlled spreading and penetration of the ink jet printing ink. For single pass ink jet printing the substrates tend to be less expensive and their coatings, if any, tend to be less well adapted to receiving ink jet printing inks. For substrates such as these the previously known ink jet printing inks often tend to penetrate too deeply into the substrate cause a loss in optical density, wicking and/or strike through.

Pigment-based inks comprise pigment particles dispersed in the ink whereas dye-based inks comprise a dye dissolved in the ink. Pigment-based inks tend to have some advantages in certain applications. For example, the light and ozone-fastness of pigment-based inks tends to be superior to dye-based inks.

That said, if the ink is pigment-based rather than dye-based then meeting many of the above requirements can be even more difficult. For example it is known that in pigment-based inks the pigment particles may tend to agglomerate or flocculate over time thereby creating oversized particles which can block or impair the printing of the tiny ink jet printer nozzles. Also, it is known that pigment-based inks often tend to flocculate if the ink contains higher relative amounts of organic liquids or strongly adsorbing surfactants. Thus, in many respects dye rather than pigment-based inks are more suited to the high printer reliability requirements of single pass printing.

In our studies we have seen that it is extremely difficult to simultaneously satisfy many or all of the above requirements. Some requirements which are especially difficult to simultaneously achieve are high optical density, high colloidal stability of the pigment-based ink and high printer reliability.

PRIOR ART

PCT patent publication WO2005/080513 discloses ink jet printing inks comprising glycerol. This patent publication does not mention encapsulated pigments, single pass ink jet printing or corrugate substrates.

DEFINITIONS

Unless stated to the contrary the words such as “a” and “an” are meant to include the possibility of having more than one of that item. For example "an" encapsulated particulate solid" also includes the possibility of having more than one encapsulated particulate solid.

In the present invention, unless indicated otherwise, all parts are by weight.

DETAILED DESCRIPTION OF THE INVENTION

First Aspect

According to a first aspect of the present invention there is provided an ink comprising an encapsulated particulate solid and a liquid vehicle wherein:

I) the encapsulated particulate solid comprises a particulate solid encapsulated with a cross-linked dispersant shell; and II) the ink comprises the components:

a. from 0.1 to 20 parts of the encapsulated particulate solid;

b. from 15 to 60 parts of glycerol;

c. from 1 to 30 parts of ethylene glycol;

d. from 0 to 20 parts of 2-pyrrolidone;

e. from 0.01 to 3 parts of surfactant;

f. from 0 to 10 parts of water-soluble polymer;

g. from 0 to 20 parts of polymer particles;

h. from 0 to 2 parts of biocide;

i. from 20 to 75 parts of water;

wherein all the parts are by weight and the sum of the components a. to i. is 100 parts.

Whilst components a. to i. add to 100 parts this does not imply that other ink components may not be present in the inks. The inks comprise components a. to i. and accordingly other ink components may be present.

Components a. and g. are often available in the form of dispersions. Components e., f. and h. are typically available as solutions. The parts of components a., e., f., g. and h. are considered on solids basis. Thus, for example, 10 parts of a polymer emulsion having a solids content of 10% by weight is 1 part by weight of polymer particles. Equally, 20 parts of an encapsulated particulate solid dispersion having a solids content of 15% by weight is 3 parts by weight of encapsulated particulate solid. As another example 1 part of a 50% by weight solution of biocide is considered to be 0.5 parts of biocide.

a. Encapsulated Particulate Solid

The encapsulated particulate solid preferably has a particle size of less than 1 micron, more preferably from 30 to 500 nm, even more preferably from 50 to 300 nm and especially from 70 to 200 nm in diameter.

The average particle diameter is preferably a Z average diameter. The particle diameter is preferably measured by for example a laser light scattering method. Suitable instruments for which include those sold by Malvern and Coulter. A preferred apparatus is a Malvern Zetasizer™.

In our studies we have found that the encapsulated particulate solids used in the present invention provide inks having good optical density, they are stable in inks which have significant amounts of glycerol and ethylene glycol and they facilitate inks which print extremely reliably in ink jet and single pass ink jet printers. The dispersants used to prepare the encapsulated particulate solids also provide excellent rheology, droplet formation and droplet breakup characteristics when used with glycerol and ethylene glycol. Whilst not wishing to be bound by any particular theory it is believed that the encapsulated particulate solids, the dispersants used to prepare the encapsulated particulate solids and single pass printer mechanism according to the first aspect of the present invention all interact synergistically to provide particularly desirable ink jetting and print performance characteristics.

Preparation of the Encapsulated Particulate Solid

The encapsulated particulate solid is preferably prepared by a process comprising cross-linking a dispersant in the presence of a particulate solid and a liquid medium.

The amount of encapsulated particulate solid in the ink is preferably from 0.1 to 20 parts, more preferably from 0.1 to 15 parts, even more preferably from 0.1 to 10 parts and especially from 1 to 10 parts by weight.

Particulate Solid

The particulate solid may be of any kind without limitation. Preferably, the particulate solid is substantially insoluble in the ink. By substantially insoluble we mean having a solubility of less than 1%, more preferably less than 0.1% by weight in the ink. Preferably, the solubility is measured at a temperature of 25° C. Preferably, the solubility is measured at a pH of 8. Preferred particulate solids are insoluble in a mixture comprising 18 parts ethylene glycol, 30 parts glycerol, 5 parts pyrrolidone and 46 parts water adjusted to a pH of 8 and at a temperature of 25° C.

Preferably, the particulate solid is or comprises a colorant, more preferably is or comprises a pigment.

The pigment may be organic or inorganic.

A preferred particulate pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones and anthanthrones, quinacridones.

Preferred inorganic pigments include: metal oxides, sulfides, nitrides and carbides (e.g. titanium dioxide and silicon dioxide), metallic pigments (e.g. aluminium flake) and especially carbon black. Of these carbon black is particularly preferred.

Preferred carbon blacks are the gas blacks, especially those sold under the Nipex® tradename by Evonik.

In the case of carbon black pigments, these may be prepared in such a fashion that some of the carbon black surface has oxidized groups (e.g. carboxylic acid and/or hydroxy groups). However, the amount of such groups is preferably not so high that the pigment may disperse in water without the aid of a dispersant (not self-dispersing).

Preferably, the pigment is not dispersible in an aqueous liquid medium (especially pure water) without the aid of a dispersant, i.e. the presence of a dispersant is required to facilitate dispersion. Preferably, the pigment is not chemically surface treated, for example by having ionic groups covalently bonded to its surface (especially not —$CO_2H$ or —$SO_3H$).

Preferably, the pigment is a cyan, magenta, yellow or black pigment.

More than one pigment may be used in the present invention.

For printing a colour ink set the pigments are preferably carbon black, C.I. Pigment Blue 15:3, C.I. Pigment Red 122 and C.I. Pigment Yellow 74.

Preferably, the particulate solid has been comminuted (e.g. milled) in the presence of a liquid (preferably a liquid comprising water) and the dispersant prior to cross-linking. By comminution we preferably mean those processes which significantly reduce the particle size of the particulate solid.

Examples of comminution methods include microfluidisation, high pressure homogenisation, ultrasonication and milling (especially bead milling). Preferably, the only dispersants present during the comminution step are those which are later cross-linked so as to encapsulate the particulate solid. This minimises any free (unencapsulated) dispersant. Preferably, the dispersant is present in an amount of from 5 to 100 parts, more preferably from 10 to 80 parts and especially from 20 to 50 parts by weight relative to 100 parts by weight of particulate solid.

After comminution the particulate solid preferably has a particle size of less than 1 micron, more preferably from 30 to 500 nm, even more preferably from 50 to 300 nm and especially from 70 to 200 nm in diameter.

The average particle diameter is preferably a Z average diameter. The particle diameter is preferably measured by for example a laser light scattering method. Suitable instruments for which include those sold by Malvern and Coulter. A preferred apparatus is a Malvern Zetasizer™.

Dispersant

Preferably, the dispersant is polymeric.

Preferably, the dispersant has a number averaged molecular weight of from 1,000 to 1,000,000, more preferably from 5,000 to 100,000 and especially from 20,000 to 80,000. Preferably the molecular weight is measured by gel permeation chromatography. Preferably the solvent used for GPC is water, tetrahydrofuran or dimethyl formamide. Preferably, the molecular weight is calibrated by means of known polystyrene or more especially polyethylene glycol standards.

Preferably, the polymeric dispersant is or comprises polyester, polyurethane, polyether, polystyrenic, poly (meth)acrylate or grafts and physical combinations thereof. Of these poly (meth)acrylates are preferred.

Preferably, the polymeric dispersant is obtained or obtainable by copolymerising at least the components i) and ii):

i) from 70 to 95 parts of one or more (meth) acrylate monomers each having no ionic groups;

ii) from 5 to 30 parts of one or more (meth) acrylate monomers each having at least one ionic group;

wherein the sum of the parts of components i) and ii) add up to 100 and all the parts are by weight.

More preferably the polymeric dispersant is obtained or obtainable by copolymerising at least the components i) to iii):

i) from 70 to 95 parts of one or more (meth) acrylate monomers each having no ionic groups;

ii) from 5 to 30 parts of one or more (meth) acrylate monomers each having at least one ionic group;

iii) no more than 20 parts by weight of one or more ethylenically unsaturated monomers each having a polyethyleneoxy group;

wherein the sum of the parts of components i) to iii) add up to 100 and all the parts are by weight.

Preferably, polymeric dispersant comprises or consists of the repeat units from (meth) acrylate monomers.

Monomers in Component i)

Preferably, component i) comprises at least 40, more preferably at least 45 parts, even more preferably at least 50 parts, especially at least 60 parts and more especially at least 70 parts by weight of benzyl methacrylate. Preferably, component i) consists exclusively of benzyl methacrylate. We have found that increasing the amount of benzyl methacrylate provides improved ink properties such as optical density, printer reliability in single pass printers and colloidal stability in the ink.

In cases where component i) comprises monomers other than benzyl methacrylate these are preferably $C_{1-20}$ hydrocarbyl (meth)acrylates. Preferably the $C_{1-20}$ hydrocarbyl group is an alkyl group. The alkyl group may be linear or branched. Preferred examples of which include butyl (meth)acrylate, octyl (meth)acrylate, 2-ethyl hexyl (meth) acrylate, methyl (meth) acrylate, isobornyl acrylate, lauryl acrylate and stearyl acrylate.

Preferably, component i) is present at from 70 to 92, more preferably from 70 to 90 and especially from 75 to 85 parts by weight.

Monomers in Component ii)

Preferably, the ionic groups in the monomers in component ii) are anionic. Preferred examples of anionic groups include phosphorus containing acid groups (phosphonic and phosphoric), sulfonic acid groups and especially carboxylic acid groups. Preferably, the (meth) acrylate monomers in component ii) each have from 1 to 3, more preferably 1 or 2 and especially just one ionic group.

Preferred examples of (meth) acrylate monomers having carboxylic acid groups include itaconic acid, fumaric acid, maleic acid, crotonic acid, betacarboxy ethyl acrylate, acrylic acid and especially methacrylic acid. Preferably component ii) comprises methacrylic acid, more preferably component ii) comprises only methacrylic acid.

Preferably, component ii) is present at from 8 to 30, more preferably from 10 to 30 and especially from 15 to 25 parts by weight.

Monomers in Component iii)

In order of increasing preference component iii) is no more than 10 parts, 5 parts, 2 parts, 1 part, 0.5 parts and 0 parts of ethylenically unsaturated monomers each carrying a polyethyleneoxy group. By ethylenically unsaturated we preferably mean C═C. For the purposes of the present invention if a monomer could belong to components i) and iii) or ii) and iii) then it belongs to component iii). Thus an ethylenically unsaturated monomer having a polyethyleneoxy group always belongs in component iii) irrespective of other groups.

By polethyleneoxy group we mean any group which is or comprises —$(CH_2CH_2O)_n$— wherein n is 2 or more. The end groups in the polyethyleneoxy chain may be of any kind. Thus ethylenically unsaturated monomers carrying alkyl, aryl, heterocyclyl and H terminated polyethyleneoxy groups are also limited in amount by component iii).

When any monomer is present in component iii) the ethylenically unsaturated monomers carrying a polyethyleneoxy group are preferably (meth) acrylates.

We have found that the requirement expressed in component iii) for low amounts of these kinds of monomers results in encapsulated particulate solids which provide improved optical density, stability and printer reliability in single pass ink jet printers.

Optional Monomers

Optional monomers other than those in components i) to iii) may be additionally present.

Preferably, the copolymerisation composition comprises no more than 50 parts, more preferably no more than 20 parts, especially no more than 10 parts and more especially no more than 5 parts by weight of optional monomers other than those mentioned in components i) to iii). It is especially preferred that polymer is obtained or obtainable by copolymerising a composition consisting only of the components i) to iii).

Preferred Polymeric Dispersants

In view of the above a preferred polymeric dispersant is obtained or obtainable by copolymerising at least the components i) to iii):

i) from 70 to 95 parts of one or more (meth) acrylate monomers each having no ionic groups comprising at least 40 parts of benzyl methacrylate;

ii) from 5 to 30 parts of methacrylic acid;

iii) no more than 5 parts, more preferably 0 parts of one or more ethylenically unsaturated monomers each carrying a polyethyleneoxy group;

wherein the sum of the parts i) to iii) add up to 100 and all the parts are by weight.

Even more preferably, the polymeric dispersant is obtained or obtainable by copolymerising at least the components i) to iii):

i) from 70 to 95 parts of benzyl methacrylate;

ii) from 5 to 30 parts of methacrylic acid;

iii) no more than 5 parts, more preferably 0 parts of one or more ethylenically unsaturated monomers each carrying a polyethyleneoxy group;

wherein the sum of the parts i) to iii) add up to 100 and all the parts are by weight.

In these polymeric dispersants it is preferred that there are no monomers other than those mentioned in components i) to iii).

Dispersant Preparation

The dispersant may be prepared by any kind of polymerisation method without particular limitation. Emulsion, bulk, suspension and especially solution polymerisation methods can be used. The initiator used in the polymerisation may be cationic, anionic or more preferably free radical. The polymerisation may be performed in the presence of chain transfer agents so as to limit the molecular weight.

Cross-linking

Preferably, the dispersant is cross-linked in the presence of the particulate solid and the liquid medium so as to prepare the encapsulated the particulate solid.

The cross-linking reaction may be effected by using a dispersant which is self cross-linkable or by the using a dispersant in combination with a cross-linking agent.

Any suitable cross-linking chemistry may be employed. Suitable cross-linking chemistries are described in PCT patent publication WO2005/061087 at page 6, table 1. Preferably, the cross-linking reaction is effected by the use of an epoxy cross-linking agent.

We have found that it is preferred that the polymeric dispersant shell is cross-linked via a reaction between a carboxylic acid and an epoxide group. We have found this to be a particularly effective cross-linking scheme which does not tend to destabilise the particulate solid dispersed in the liquid medium. Preferably, the carboxylic acid groups are present in the dispersant and the epoxide is added as cross-linking agent.

Low temperatures for cross-linking are preferred as this results in lower levels of flocculation and particle size growth of the particulate solid in the liquid medium. Preferably, the cross-linking reaction is performed at a temperature from 10° C. to 90° C. and more preferably from 30° C. to 70° C.

The pH for the cross-linking reaction is preferably from 7 to 14, more preferably from 7 to 12 and especially preferably from 8 to 11.

A borate compound is preferably present during the cross-linking reaction. We have found that this improves the effectiveness of the cross-linking reaction.

The borate compound preferably comprises boric acid, metaboric acid, tetraboric acid or pyroboric acid, or a mixture thereof, or a salt thereof.

The time for the cross-linking reaction depends to some extent on the temperature and the pH. However, a preferred time is from 1 to 24 hours, more preferably from 1 to 8 hours.

Liquid Medium

The liquid medium as used herein refers to the liquid components present during the preparation of the encapsulated particulate solid. The liquid components in the final ink are referred to as the liquid vehicle.

The liquid medium is preferably polar.

Examples of suitable polar liquid media include ethers, glycols, alcohols, polyols, amides, ketones and especially water.

Preferably, the liquid medium is or comprises water as this tends to result in a particularly stable and fine encapsulated particulate solid. Preferably, the liquid medium comprises from 1 to 100%, more preferably from 10 to 100%, especially from 30 to 100%, more especially from 50 to 100% even more especially from 60 to 100% and most especially from 80 to 100% water by weight. The remainder is preferably one or more polar organic liquids. In some cases it is preferred that the liquid medium comprises water and less than 5%, more preferably less than 2%, especially less than 1% and most especially 0% of organic liquids. Liquid media which are almost exclusively comprised of water offer the best options for formulating inks and are more environmentally friendly.

When the liquid medium comprises more than one liquid said liquid medium may be in the form of a multi phase liquid (e.g. a liquid-liquid emulsion) but is preferably in the form of a single phase (homogeneous) liquid.

Preferably, the polar liquids other than water are water-miscible.

In one case the liquid medium comprises water and a water-miscible organic liquid. Such a liquid medium is useful because it assists in dissolving and/or dispersing a wider range of cross-linking agents and facilitates the use of more hydrophobic dispersants.

Preferred water-miscible organic liquids for inclusion into the liquid medium include:

i) $C_{1-6}$-alkanols, preferably methanol, ethanol, n-propanol, isopropanol, n-butanol, sec-butanol, tert-butanol, n-pentanol, cyclopentanol and cyclohexanol;

ii) linear amides, preferably dimethylformamide or dimethylacetamide;

iii) ethers, preferably tetrahydrofuran and dioxane;

iv) diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol;

v) triols, preferably glycerol and 1,2,6-hexanetriol;

vi) ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)-ethoxy]-ethanol and ethyleneglycol monoallylether;

vii) cyclic amides, preferably 2-pyrrolidone, N-methyl-2-pyrrolidone, N-ethyl-2-pyrrolidone, caprolactam and 1,3-dimethylimidazolidone.

In some cases, the liquid medium comprises water and 1 or more, especially from 1 to 8, water-miscible organic liquids.

In many cases it is preferable to remove any organic liquids from the dispersions of encapsulated particulate solid prior to formulating the inks according to the first aspect of the present invention.

This removal may be done by methods including distillation, isolation and re-dispersion or more preferably by membrane washing.

Purification of the Encapsulated Particulate Solid

Preferably, the encapsulated particulate solid has been purified prior to formulating the ink. Preferably, impurities such as unwanted free unencapsulated dispersant, un-used cross-linking agent and borate materials (when present) are substantially removed. Preferred purification methods include filter washing and especially membrane treatment.

b. Glycerol

Glycerol is also known by other common names including glycerine and glycerin. The formal IUPAC name is propan-1,2,3-triol.

Preferably, the amount of glycerol in the ink is from 15 to 50, more preferably from 15 to 40, even more preferably from 17 to 40, especially from 20 to 40 and more especially from 25 to 35 parts by weight. In an especially preferred case the amount of glycerol in the ink is 30+/−2 parts by weight. In many cases it is preferred that the amount of glycerol is at least 17 parts by weight.

c. Ethylene Glycol

Ethylene glycol is also known by the simpler name glycol. The formal IUPAC name is Ethan-1,2-diol.

Preferably, the amount of ethylene glycol in the ink is from 5 to 30 parts, more preferably from 5 to 25 parts, even more preferably from 7 to 25 parts and especially from 10 to 25 parts. In an especially preferred case the amount of ethylene glycol in the ink is 18+/−2 parts by weight. In many cases it is preferred that the amount of ethylene glycol is at least 7 parts by weight.

d. 2-Pyrrolidone

2-Pyrrolidone (which in this case is the formal IUPAC name) is also less commonly referred to as 2-Pyrrolidinone or 2-Pyrol.

Preferably, the amount of 2-Pyrrolidone in the ink is from 0.1 to 20, more preferably from 1 to 15, especially from 1 to 10, more especially from 2.5 to 7.5 parts by weight. In some cases the amount of 2-Pyrrolidone in the ink is from 0 to 20, more preferably from 0 to 10 parts by weight.

e. Surfactant

The amount of surfactant in the ink is preferably from 0.1 to 2, more preferably from 0.1 to 1.5, even more preferably from 0.15 to 1.5, especially from 0.5 to 1.5 parts by weight. In an especially preferred case the amount of surfactant in the ink is 0.8+/−0.2 parts by weight. In another case the amount of surfactant is 0.4 parts+/−0.2 parts by weight.

The surfactant may be of any kind without any particular limitation. Preferred surfactants are amphiphilic (having a hydrophobic and a hydrophilic group). Preferred hydrophilic groups are sulfonic acid, phosphonic acid, carboxylic acid and ethyleneoxy groups. Preferred hydrophobic groups are aryl, alkyl, propyleneoxy and butyleneoxy groups and combinations thereof.

Surfactants having an Acetylenic diol structure are preferred (especially 2,4,7,9-tetramethyl-5-decyne-4,7-diol and the corresponding ethoxylated compounds). Preferred examples of which include the surfactants sold under the Surfynol™ tradename surfactants and especially Surfynol™ 465, 104E and 440 which are available from Air Products. Of these, Surfynol™ 104E is preferred which is 2,4,7,9-tetramethyl-5-decyn-4,7-diol (CAS N° 126-86-3).

One or more of these surfactants may be used.

We have found that these amounts and preferred types of surfactants when used in combination with glycerol and ethylene glycol provide excellent droplet ejection and breakup characteristics which are particularly important for ink jet printing and especially single pass ink jet printing. These preferred acetylenic diol surfactants also desirably provide inks with a low tendency to foam.

The process of inkjet printing is a dynamic process where the surface of the ink is constantly disturbed. In this environment the surface tension of an ink at a very low surface age is significant and can have an affect on drop velocity, and voltages required, latency, print quality and optical density. In an ink formulation the careful selection of the surfactant type, its mobility and the amount is desirable so as to provide an ink with even better droplet formation and jetting characteristics.

f. Water-soluble Polymer

For clarity when a polymer is both water soluble and is a surfactant it is considered herein to be a surfactant (component e.).

The water soluble polymer may be of any kind without particular limitation. By the words "water soluble" as used herein we include polymers having a solubility of at least 5% by weight in water. Preferably, the water is distilled water. Preferably, any acid groups in the polymer are neutralised with sodium hydroxide and any basic groups in the polymer are neutralised with acetic acid. Preferably, the neutralisation is 100% based on the stoichiometry of the acid or basic groups present. Preferably, the solubility is measured at 25° C. Soluble polymers tend to dissolve so as to form completely (or almost completely) clear solutions of the polymer in water.

Examples of suitable water-soluble polymers include polymers of ethylenically unsaturated monomers (e.g. polyacrylics, polyacryamides, polyvinyl alcohols and polyvinyl pyrrolidones), polyesters, polyurethanes, celluloses and especially polyethylene glycols (sometimes also called polyethyleneoxides).

Preferably, the water soluble-polymer is or comprises polyethylene glycol.

Preferably, the water-soluble polymer has a molecular weight of from 150 to 200,000, more preferably from 1,000 to 100,000; even more preferably from 5,000 to 50,000 and especially from 10,000 to 30,000. In one case the water-soluble polymer preferably has a molecular weight of from 30,000 to 40,000. The molecular weight is preferably a number averaged molecular weight established by gel permeation chromatography.

Preferably, the amount of water-soluble polymer in the ink is no more than 7 parts, more preferably no more than 5 parts and more especially no more than 3 parts by weight. In some cases it is desirable that the amount of water-soluble polymer in the ink is at least 0.1, more preferably at least 0.2 parts by weight.

Preferred amounts of water-soluble polymer are from 0.01 to 7, more preferably from 0.05 to 5, especially from 0.1 to 3 parts by weight.

Whilst not wishing to be limited by theory it is thought that water-soluble polymers and especially polyethylene glycol tends to assist in tuning the rheology of the ink so as to facilitate especially good ink jet firing and printing.

In some cases two or more different water-soluble polymers can be used, especially two or more different polyethylene glycols. Preferably, the two or more polyethylene glycols have different molecular weights. Preferably, one polyethylene glycol has a molecular weight of from 1,000 to 50,000 and another polyethylene glycol has a molecular weight of from 150 to 999.

In some cases it can be advantageous that component f. comprises a water-soluble polymer other than polyethylene glycol. In some cases component f. comprises both a water soluble polymer other than polyethylene glycol and polyethylene glycol. Preferred water soluble polymers other than polyethylene glycol include polyesters, polymers from polymerising ethylenically unsaturated monomers and especially polyurethanes.

For clarity the water soluble polymer does not encapsulate the particulate solid nor does it appreciably act as a dispersant in any respect.

g. Polymer Particles

The ink may optionally comprise polymer particles. Any kind of polymer particles may be used without limitation. When present the polymer particles are separate and distinct from the encapsulated particulate solid. The polymer in the polymer particles may be a polystyrenic, poly(meth)acrylic, poly-co-styreneic-(meth)acrylic, polyester, polyether, polyurethane, polycarbonate or polyamide polymer including grafts and physical blends thereof. The polymer may also be a natural polymer such as a cellulosic, protein or wax.

Preferably, the polymer particles have an average particle diameter of no more than 1 micron, more preferably from 10 to 500 nm, especially from 30 to 200 nm and most especially from 30 to 150 nm. The preferred method for establishing the particle size of the polymer particles is by photon correlation spectroscopy.

When present the polymer particles may be used to assist in binding of the particulate solid to the substrate or to improve the gloss of the final print. Polymer particles tend to have little influence on the ink rheology at typical dilutions.

Particularly preferred polymer particles are those prepared by polymerising ethylenically unsaturated monomers (especially acrylates, methacrylates, styrenics etc). Other useful polymer particles include polyesters and polyurethanes. The polymer particles tend to have a solubility of less than 5%, more preferably less than 1% by weight by weight in water using the same methods as mentioned previously for water-soluble polymers.

We have found that the presence of larger amounts of polymer particles can be detrimental to ink jet operability and latency. Thus, it is preferred that the amount of polymer particles in the ink is no more than 15, more preferably no more than 12, especially no more than 10 parts, more especially no more than 5 parts and most especially no more than 3 parts by weight. In some cases the amount of polymer particles in the ink is from 0.1 to 15, more preferably from 1 to 12 parts and especially 3 to 10 parts by weight. We have found that these amounts of polymer particles tend to improve the adhesion and wet-fastness properties of the final ink printed on a substrate.

In some cases it is preferred that polymer particles are absent from the ink. Of course, the words polymer particles are not meant to refer to the encapsulated particulate solid when the dispersant is polymeric.

Polymer particles can be made by many possible methods including solution dispersion, melt dispersion, suspension and especially emulsion polymerisation methods.

The polymer particles can be colloidally stabilised by an adsorbed surfactant and/or by water-dispersing groups which are part of the polymer particle structure.

h. Biocide

The ink may optionally comprise a biocide or a mixture of biocides.

Any biocide may be used without any particular limitation. We have found that 1,2-BENZISOTHIAZOLIN-3-ONE which is commercially available as Proxel™ GXL is particularly suitable as a biocide for the inks of the present invention. The amount of biocide in the ink is preferably no more than 1.5 parts, especially no more than 1 part by weight.

The amount of biocide in the ink is preferably from 0.0001 to 1.5 parts, more preferably 0.01 to 1 parts, especially 0.01 to 0.3 parts by weight.

i. Water

The amount of water in the ink is preferably from 25 to 70, more preferably from 30 to 60, especially from 35 to 55 and more especially from 40 to 55 parts by weight. In a preferred case the amount of water in the ink is 46+/−2 parts by weight.

The water is preferably purified prior to formulation into the ink. Preferably, the water is purified by means of contact with deionizer resins, distillation and/or reverse osmosis.

j. Optional Ink Components

The ink may optionally comprise ink components other than those in components a. to i.

Examples of suitable optional ink components include: metal chelating agents; kogation inhibitors; rheology modifiers other than water-soluble polymers, dyes; further dispersants, water-miscible organic liquids (other than glycerol, ethyleneglycol and 2-pyrrolidone); unencapsulated particulate solids (e.g. pigments), antifoaming agents; bases, buffers and the like.

Preferably, the ink comprises no more than 10, more preferably no more than 5 and especially no more than 3 parts by weight of all optional ink components present in the ink.

It is preferred that the ink comprises no dispersant other than the dispersant which is cross-linked so as to encapsulate the particulate solid.

Preferred Ink Compositions

Preferably, components b, c and d add up to at least 30 parts, more preferably at least 35 parts, more especially at least 40 parts by weight.

In view of the above preference a preferred ink comprises the components:

a. from 0.1 to 10 parts of the encapsulated particulate solid;
b. from 20 to 40 parts of glycerol;
c. from 5 to 25 parts of ethylene glycol;
d. from 0 to 10 parts of 2-pyrrolidone;
e. from 0.1 to 2 parts of surfactant;
f. from 0 to 5 parts of polyethylene glycol;
g. from 0 to 15 parts of polymer particles;
h. from 0 to 1 parts of biocide;
i. 35 to 55 parts of water;

wherein all the parts are by weight and the sum of the parts a. to i. is 100.

We have found that these inks print especially reliably from ink jet printers and especially single pass ink jet printers. Furthermore, these inks print effectively on corrugate and newsprint substrates.

Ink Characteristics

Preferably, the ink is an ink jet printing ink (i.e. an ink which is capable of printing from an ink jet printer).

The following ink requirements provide inks which are especially suitable for ink jet printing and for single pass ink jet printing.

The ink according to the first aspect of the present invention should preferably have a pH of equal to or above 7, more preferably from 7 to 12 and especially from 8 to 11. Preferably, the dispersant used to encapsulate the particulate solid is neutralised with a base. The base may be an alkali metal hydroxide, an organic amine, an alkanolamine or ammonia. Accordingly, any ionic (pref acidic) groups in the dispersant may be in the salt, free acid or free base form.

The ink preferably has a surface tension of from 20 to 50, more preferably from 20 to 40 and especially from 25 to 35 mN/m. Preferably, the surface tension is measured by a Kibron Aquapi Tensiometer apparatus. Preferably, the surface tension is measured with the ink at 25° C.

Preferably, the ink has been filtered through a filter having an average pore diameter of no more than 5 microns, more preferably no more than 2 microns and especially no more than 1 microns.

The ink preferably has a viscosity of no more than 50, more preferably no more than 30 and especially no more than 20 mPa·s when measured at 30° C. A preferred apparatus for measuring the viscosity is a Brookfield DV II viscometer, preferably using spindle number 0 or 18. Preferred viscosities for the ink are from 1 to 20, more preferably from 2 to 17 and especially from 3 to 15 mPa·s.

Preferably, the ink comprises less than 500, more preferably less than 250 and especially less than 100 ppm of metal ions which are multivalent (di or higher valent). As used herein ppm means parts per million by weight.

Ink Preparation Method

The ink components may be mixed together in any order and by using any suitable apparatus or method. Preferably, the encapsulated particulate solid is mixed with the other ingredients in the form of a dispersion in water.

A preferred method for preparing the inks comprises the steps:

i) Adding together the surfactant and ethylene glycol together to form a surfactant solution;
ii) Adding the remaining ink components except the encapsulated particulate solid to the surfactant solution formed in step i) to form a liquid vehicle;
iii) Adding the liquid vehicle formed in step ii) to an aqueous dispersion of the encapsulated particulate solid.

Preferably all of steps i) to iii) are performed whilst the ink components are being mixed. A suitable mixer is a paddle mixer or a homogeniser.

Second Aspect

According to a second aspect of the present invention there is provided a process for printing an ink according to the first aspect of the present invention onto a substrate.

Ink Jet Printing

Preferably, the printer is an ink jet printer and especially a single pass ink jet printer. Preferably, the printing is performed by means of an ink jet printer. Preferably, the single pass ink jet printer has one or more ink jet printing heads which singly or in combination extend across the entire width of the printing zone. The printing zone may be wider than 2.5 cm, 5 cm, 10 cm, 20 cm, 50 cm, 100 cm etc. In fact, in some printers the print zone is wider than 1 m, 1.5 m or even larger than 2 m. Preferably, the printing is performed in a single pass using a single pass ink jet printer.

The ink jet printer may eject ink droplets using piezo, thermal or acoustic heads.

Substrates

The inks of the present invention are generally suitable for a wide range of substrates such as paper, textile, glass, ceramic, metal and plastic substrates.

That said, the inks of the present invention are especially suited to porous substrates. Of the porous substrates those comprising paper are most preferred.

One preferred substrate is corrugate (aka corrugated paper). Corrugate substrates by their very nature tend to be thicker and have higher masses per $m^2$ than many substrates. Preferred corrugates have a mass of from 40 to 800 $g/m^2$, more preferably from 100 to 800 $g/m^2$ and especially from 200 to 800 $g/m^2$. The term corrugate as used herein preferably means those paper substrates comprising paper having a corrugated shape. The corrugate may (and preferably does) have one, two or more linerboards. The corrugate may be single layer or multilayer with linerboards optionally between the corrugated paper layers.

Whilst the inks may be printed onto a corrugated surface it is preferably printed onto a flat paper linerboard.

The inks are especially suitable for substrates having a porous surface and a mass of from 40 to 800 $g/m^2$.

Corrugate tends to be highly adsorbent and has a surface on which the formation of high quality prints by means of ink jet tends to be particularly difficult. A particular problem printing on corrugate is wicking wherein the ink tends to spread across the surface degrading the image quality. Another problem is that the inks may penetrate too deeply into the corrugate and thus the prints exhibit a low optical density at the surface. We have found that the present ink provides a good balance of properties including good optical density and image quality even on corrugate. Printing at high optical density is even more difficult where the printing is performed in a single pass. In such a system there are no subsequent chances to re-apply further layers of ink onto the printed region.

Another preferred substrate is newsprint. Newsprint is a porous paper containing substrate. Newsprint (unlike corrugate) is normally a single flat sheet. Newsprint tends have significantly lower masses per $m^2$ than corrugate. Preferred newsprint substrates have a mass from 10 to 200 $g/m^2$, especially from 20 to 200 $g/m^2$ and more especially 40 to 200 $g/m^2$. A problem with previous inks is that they tend to strike through the thinner newsprint substrate such that the ink is visible on the reverse side of the substrate. Inks according to the first aspect of the present invention have been found to print well, with high optical density whilst minimising strikethrough.

Containers for the Ink

So as to provide a means to store the ink and so as to supply an ink jet printer with the inks according to the first aspect of the present invention, the ink may be retained in a vessel.

Accordingly, in a third aspect of the present invention there is provided a vessel containing an ink according to the first aspect of the present invention.

The vessel is preferably adapted such that it can be connected to an ink jet printer and ultimately to its printing heads so as to allow the ink to pass from the vessel through the printer and to the heads. Examples of suitable vessels include cartridges, bottles, tubs, tanks and the like. Preferably, the vessel has a point at which it can be connected to the printer such that ink may be delivered to the printer heads without spillage of the ink and without air being entrained into the ink flow.

Ink Jet Printer

According to a fourth aspect of the present invention there is provided an ink jet printer comprising an ink jet printing head and a vessel according to the third aspect of the present invention. During printing the ink flows from the vessel to the ink jet printer heads through tubes, channels, small pipes and the like.

EXAMPLES

The present invention will now be illustrated by the following examples in which all parts are by weight unless stated to the contrary.

1. Preparation of the Encapsulated Particulate Solid 1.1 Preparation of Dispersant (1)

A dispersant was prepared by solution copolymerisation of benzyl methacrylate and methacrylic acid at weight proportions of 78.5 to 21.5 respectively. The dispersant was isolated in the form of a dry solid. This was Dispersant (1). Dispersant (1) had an acid value of 2.5 mmoles of acid groups/g of dispersant.

1.2 Preparation of Dispersant Solution (1)

Dispersant (1) 200 parts was dissolved in water to make up to 1000 parts and neutralised with potassium hydroxide aqueous solution to give an aqueous solution having a pH of about 9. This resulted in Dispersant Solution (1) which contained approximately 20% by weight of Dispersant (1).

1.3 Preparation of Mill-bases 1.3.1 Black Mill-base (1)

Pigment powder (90 parts of a Carbon Black pigment) and Dispersant solution (1) (180 parts) were mixed together to form a premixture. Water was added to the premixture as appropriate to provide a suitable viscosity for mixing and milling.

The premixture was thoroughly mixed together. After mixing the mixture was transferred to a bead mill containing milling beads. The mixture was then milled for several hours until the desired particle size of approximately 110 nm had been reached. The particle size was the Z averaged particle size as measured by a Malvern Zetasizer™.

The milling beads were then removed from the milled mixture. This resulted in Black Mill-base (1).

1.3.2 Magenta Mill-base (1)

Magenta Mill-base (1) was prepared in exactly the same way as Black Mill-base (1) except that Magenta Pigment (85 parts of C.I. Pigment 122) and Dispersant solution (1) (127.5 parts) were used in place of the corresponding components described in Black Mill-base (1). For Magenta Mill-base (1) the milling was continued for several hours until a particle size of approximately 120 nm had been obtained. The particle size was the Z averaged particle size as measured by a Malvern Zetasizer™. This resulted in Magenta Mill-base (1).

1.3.3 Yellow Mill-base (1)

Yellow Mill-base (1) was prepared in exactly the same way as Black Mill-base (1) except that Yellow Pigment (100 parts of C.I. Pigment Yellow 74) and Dispersant solution (1) (250 parts) were used in place of the corresponding components described in Mill-base (1). For Yellow Mill-base (1) the milling was continued for several hours until a particle size of approximately 120 nm had been obtained. The particle size was the Z averaged particle size as measured by a Malvern Zetasizer™. This resulted in Yellow Mill-base (1).

1.3.4 Cyan Mill-base (1)

Pigment powder (150 parts of a C.I. Pigment Blue 15:3 powder), Dispersant solution (1) (225 parts) were mixed together to form a premixture. Water was added to the premixture as appropriate to provide a suitable viscosity for mixing and milling.

The premixture was thoroughly mixed together. After mixing the mixture was transferred to a bead mill containing milling beads. The mixture was then milled for several hours until the desired particle size of approximately 120 nm had been reached. The particle size was the Z averaged particle size as measured by a Malvern Zetasizer™.

The milling beads were then removed from the milled mixture. This resulted in Cyan Mill-base (1).

1.4 Preparation of Encapsulated Particulate Solid

All the mill-bases in sections 1.3.1 to 1.3.4 were adjusted to a solids content of about 10% by weight by the addition of pure water.

The dispersants in each of the mill-bases were then cross-linked using a cross-linking agent, (Denacol™ EX-321 obtained from Nagase ChemteX, with weight per epoxy=140, hereafter abbreviated as EX-321). This cross-linked the carboxylic acid groups in the dispersant and thereby encapsulated the pigment. The cross-linking reaction was controlled by the presence of a small amount of boric acid (obtained from Aldrich). The cross-linking reaction was effected by heating the above described mixture to a temperature of about 65° C. for 5 hours. This prepared a range of different Encapsulated particulate solids with the references as indicated in column 1 of Table 1.

TABLE 1

| Cross-linking | | | |
|---|---|---|---|
| Encapsulated particulate solid | Mill-base (parts) | Cross-linking agent (parts) | Boric acid parts |
| EPS 1 | Cyan Mill-base 1 (3) | EX321 (6.3) | 2.78 |
| EPS 2 | Magenta Mill-base 1 (3) | EX321 (3.57) | 1.58 |
| EPS 3 | Yellow Mill-base 1 (3) | EX321 (4.9) | 2.16 |
| EPS 4 | Black Mill-base 1 (3) | EX321 (5.04) | 2.23 |

1.5 Purification of the Encapsulated Particulate Solid

The Encapsulated particulate solids prepared above in 1.4 were each purified by means of ultrafiltration. The encapsulated pigment dispersions were diafiltered with pure water. The ultrafiltration membrane was then used to concentrate the encapsulated dispersion back to a solids content of around 10 to 13% by weight.

2. Preparation of the Inks

Ink compositions 1 to 11 were prepared by mixing the ingredients shown in

Tables 2 to 4 wherein the numbers of each ingredient represent the parts by weight.

The mixing method for preparing the inks was as follows:

Step 1—Surfactant Surfynol™ 104E was added to a vessel containing Ethylene Glycol and the mixture was stirred to form a surfactant solution.

Step 2—The rest of the ink components except the encapsulated particulate solid dispersion were added to the surfactant solution. Stirring was performed for 10 minutes. This formed a liquid vehicle.

Step 3—To the encapsulated particulate solid dispersion, the liquid vehicle formed above was added while stirring to ensure particle stability during formulation. The resulting Ink formulation was stirred for a further 20 minutes or until a homogenous Ink was obtained. The stirring was performed by means of a paddle stirrer.

TABLE 2

| Inks 1 to 4 | | | | | |
|---|---|---|---|---|---|
| Component | | Ink 1 | Ink 2 | Ink 3 | Ink 4 |
| a. encapsulated particulate solid | | | | | |
| a. Cyan pigment | EPS 1 | 4 | | | |
| a. Magenta pigment | EPS 2 | | 4 | | |
| a. Yellow pigment | EPS 3 | | | 4 | |

TABLE 2-continued

| Inks 1 to 4 | | | | | |
|---|---|---|---|---|---|
| Component | | Ink 1 | Ink 2 | Ink 3 | Ink 4 |
| a. Black pigment | EPS 4 | | | | 4 |
| b. glycerol | | 30 | 30 | 30 | 30 |
| c. ethylene glycol | | 18 | 18 | 18 | 18 |
| d. 2-pyrollidone | | 5 | 5 | 5 | 5 |
| e. surfactant | Surfynol$^R$ ™ 104 E | 0.8 | 0.8 | 0.8 | 0.8 |
| f. polyethylene glycol | Mn 20,000 | 0 | 0 | 0 | 0 |
| h. biocide | Proxel$^R$ ™ GXL | 0.02 | 0.02 | 0.02 | 0.02 |
| i. Water | Deionized | 46.18 | 46.18 | 46.18 | 46.18 |

TABLE 3

| Inks 5 to 8 | | | | | |
|---|---|---|---|---|---|
| Component | | Ink 5 | Ink 6 | Ink 7 | Ink 8 |
| a. encapsulated particulate solid | | | | | |
| Cyan | EPS 1 | 4 | | | |
| Magenta | EPS 2 | | 4 | | |
| Yellow | EPS 3 | | | 4 | |
| Black | EPS 4 | | | | 4 |
| b. glycerol | | 30 | 30 | 30 | 30 |
| c. ethylene glycol | | 18 | 18 | 18 | 18 |
| d. 2-pyrollidone | | 5 | 5 | 5 | 5 |
| e. surfactant | Surfynol$^R$ ™ 104 E | 0.8 | 0.8 | 0.8 | 0.8 |
| f. polyethylene glycol | Mn 20,000 | 1.87 | 1.73 | 1.27 | 1.47 |
| h. biocide | Proxel$^R$ ™ GXL | 0.02 | 0.02 | 0.02 | 0.02 |
| i. Water | Deionized | 44.31 | 44.45 | 44.91 | 44.71 |

TABLE 4

| Inks 9 to 11 | | | | |
|---|---|---|---|---|
| Component | | Ink 9 | Ink 10 | Ink 11 |
| a. encapsulated particulate solid | | | | |
| Cyan | EPS 1 | | | |
| Magenta | EPS 2 | | | |
| Yellow | EPS 3 | | | |
| Black | EPS 4 | 4 | 4 | 4 |
| b. glycerol | | 30 | 28 | 18 |
| c. ethylene glycol | | 18 | 10 | 10 |
| d. 2-pyrollidone | | 0 | 5 | 5 |
| e. surfactant | Surfynol$^R$ ™ 104 E | 0.4 | 0.4 | 0.4 |
| f. polyethylene | Mn 200 | 0 | 0 | 10 |
| glycol | Mn 10,000 | 0 | 0.633 | 0.5 |
| h. biocide | Proxel$^R$ ™ GXL | 0.02 | 0.02 | 0.02 |
| i. Water | Deionized | 47.58 | 51.95 | 52.08 |

In each case the amount of the encapsulated pigment (e.g. cyan, yellow, magenta and black) in the tables 2 to 4 were based on the active (or solid) amount of pigment. Thus 4 parts of pigment (used throughout the inks 1 to 11) corresponds to 40 parts of the EPS dispersion at 10% by weight pigment content.

In tables 2 to 4 the amount of water in i) includes all the water which comes in from any of the Ink components such as the encapsulated particulate solid dispersions (which are approximately 90% water). Thus for example in Ink 9, 47.58 parts of water results from 36 parts of water from EPS 4 and the remaining water (11.58 parts) is added directly to make the up the stated amounts.

3. Physical Properties of the Inks

The pH values of the Inks 1 to 11 were measured using a pH meter.

The viscosities of Inks 1 to 11 were measured at a temperature of 30° C. using the preferred method as previously stated.

The surface tensions were measured using a Kibron Aquapi apparatus with the ink at a temperature of 25° C.

The physical properties of the Inks were as summarised in Table 5.

TABLE 5

| Physical properties of the Inks of the present invention. | | | |
|---|---|---|---|
| Ink | Viscosity (mPa · s) | Surface Tension (mN/m) | pH |
| 1 | 7.6 | 33.1 | |
| 2 | 6.76 | 32.1 | |
| 3 | 7.23 | 31.8 | |
| 4 | 7 | 31.3 | |
| 5 | 12.5 | 33.1 | 9.5 |
| 6 | 12.3 | 32 | 9.2 |
| 7 | 11.8 | 31.8 | 9.3 |
| 8 | 11.4 | 31.3 | 9.3 |
| 9 | 6.3 | 34.2 | 9.2 |
| 10 | 5.94 | 34.4 | 9.2 |
| 11 | 5.89 | 35.1 | 9.2 |

4. Ink Jet Printing

The inks of the present invention were found to print especially well from ink jet printers. Excellent ink droplet formation and breakup was observed. It occurred to the inventors that the excellent droplet formation and breakup characteristics were the result of the synergistic combination of the encapsulated particulate solids, the dispersants used to prepare the encapsulated particulate solids and the glycerol/ethylene glycol/water ink vehicles.

The inks fired reliably even after long print runs. The inks printed well onto corrugate and newsprint. The inks provided a high optical density, rapid drying and low levels of penetration into the substrate.

The invention claimed is:

1. An ink comprising an encapsulated particulate solid and a liquid vehicle wherein:

I) the encapsulated particulate solid comprises a particulate solid encapsulated with a cross-linked dispersant shell; and II) the ink comprises the components:

a. from 0.1 to 20 parts of the encapsulated particulate solid;

b. from 20 to 40 parts of glycerol;

c. from 1 to 30 parts of ethylene glycol;

d. from 0 to 20 parts of 2-pyrrolidone;

e. from 0.01 to 3 parts of surfactant;

f. from 0 to 10 parts of water-soluble polymer;

g. from 0 to 20 parts of polymer particles;

h. from 0 to 2 parts of biocide;

i. from 20 to 75 parts of water;

wherein all the parts are by weight and the sum of the components a. to i. is 100 parts.

2. The ink according to claim 1 wherein the surfactant has an acetylenic diol structure.

3. The ink according to claim 1 wherein the amount of glycerol is 25 to 35 parts.

4. The ink according to claim 1 wherein the amount of ethylene glycol is from 10 to 25 parts.

5. The ink according to claim 1 wherein the amount of water is from 30 to 60 parts.

6. The ink according to claim 1 wherein the amount of 2-pyrrolidone is from 1 to 10 parts.

7. The ink according to claim 1 wherein the water soluble polymer is or comprises polyethylene glycol.

8. The ink according to claim 7 wherein the polyethylene glycol has a number averaged molecular weight of from 5,000 to 50,000.

9. The ink according to claim 1 wherein the amount of surfactant is from 0.1 to 2 parts by weight.

10. The ink according to claim 1 wherein the surfactant has an acetylenic diol structure, the amount of glycerol is 25 to 35 parts, the amount of ethylene glycol is from 10 to 25 parts, the amount of water is from 30 to 60 parts, the amount of 2-pyrrolidone is from 1 to 10 parts, the water soluble polymer is or comprises polyethylene glycol having a number averaged molecular weight of from 5,000 to 50,000, the amount of polyethylene glycol is from 0.1 to 3 parts by weight, and wherein the amount of surfactant is from 0.1 to 2 parts by weight.

11. The ink according to claim 1 wherein the dispersant is polymeric and is obtained or obtainable by copolymerising at least the components i) and ii):

i) from 70 to 95 parts of one or more (meth) acrylate monomers each having no ionic groups;

ii) from 5 to 30 parts of one or more (meth) acrylate monomers each having at least one ionic group;

wherein the sum of the parts of components i) and ii) add up to 100 and all the parts are by weight.

12. The ink according to claim 1 wherein the dispersant shell is cross-linked via a reaction between a carboxylic acid and an epoxide group.

13. The ink according to claim 1 comprising the components:

a. from 0.1 to 10 parts of the encapsulated particulate solid;

b. from 20 to 40 parts of glycerol;

c. from 5 to 25 parts of ethylene glycol;

d. from 0 to 10 parts of 2-pyrrolidone;

e. from 0.1 to 2 parts of 2,4,7,9-tetramethyl-5-decyn-4,7-diol surfactant;

f. from 0 to 5 parts of polyethylene glycol;

g. from 0 to 15 parts of polymer particles;

h. from 0 to 1 parts of biocide;

i. 35 to 55 parts of water;

wherein all the parts are by weight and the amount of water is chosen such that the sum of the components a. to i. is 100 parts.

14. The ink according to claim 1 having a viscosity of no more than 50 mPa·s at a temperature of 30° C.

15. A process for printing an ink according to claim 1 onto a substrate by means of an ink jet printer.

16. A process for printing an ink according to claim 10 onto a substrate by means of an ink jet printer.

17. The process according to claim 16 wherein the ink jet printing is performed in a single pass using a single pass ink jet printer.

18. The process according to claim 15 wherein the substrate comprises corrugated paper.

19. The ink according to claim 10 wherein the dispersant is polymeric and is obtained or obtainable by copolymerising at least the components i) and ii):

i) from 70 to 95 parts of one or more (meth) acrylate monomers each having no ionic groups;

ii) from 5 to 30 parts of one or more (meth) acrylate monomers each having at least one ionic group;

wherein the sum of the parts of components i) and ii) add up to 100 and all the parts are by weight.

20. The ink according to claim 19 wherein the dispersant shell is cross-linked via a reaction between a carboxylic acid and an epoxide group.

* * * * *